Feb. 6, 1968 P. C. TORIGIAN 3,367,043

MODULAR CONTROL DRYER

Filed April 21, 1965 2 Sheets-Sheet 1

INVENTOR.
PUZANT C. TORIGIAN
BY
Jacobs & Jacobs
Attorneys

Feb. 6, 1968     P. C. TORIGIAN     3,367,043
MODULAR CONTROL DRYER

Filed April 21, 1965     2 Sheets-Sheet 2

INVENTOR.
PUZANT C. TORIGIAN
BY
Jacobs & Jacobs
Attorneys

3,367,043
MODULAR CONTROL DRYER
Puzant C. Torigian, Douglaston, N.Y., assignor to Tobaccoless Smokes, Inc., New York, N.Y., a corporation of New York
Filed Apr. 21, 1965, Ser. No. 449,764
7 Claims. (Cl. 34—193)

The present invention relates to equipment for controlling dehydration, curing and/or baking operations particularly in connection with fresh vegetables and their leaves. The present invention is especially concerned with the production of a tobaccoless smoking product from the fresh leaves of lettuce, spinach, and the like.

It has been found to be particularly difficult to dehydrate, cure and/or bake fresh lettuce leaves and the like because they not only contain heat-sensitive enzyme systems but their moisture content is primarily captive within the cells. If the removal of moisture is too rapid and/or at too high a temperature a phenomenon known as "case hardening" occurs wherein the external fluid phase solidifies and acts as a sealant and thereafter the transfer of moisture to the surface for removal is prevented or greatly retarded. It is also necessary to retain the various enzyme systems substantially unimpaired during at least the initial portion of the processing because they promote ripening and curing and at the same time tend to retard or inhibit spoilage and decay. As the amount of moisture is reduced the enzymatic reactions are eventually retarded or even stopped. There is therefore a difficult problem presented which has not heretofore been satisfactorily solved.

According to the present invention equipment is provided which makes it possible to correlate the important factors in converting fresh leaves to a tobacco substitute suitable for the manufacture of tobaccoless smokes. The tobacco substitute made from fresh leaves treated in the equipment of the present invention is bland and non-irritating, free from nicotine and very low in or substantially free from tar content so that the product makes a very satisfactory substitute for conventional cigarettes.

In the accompanying drawing wherein a preferred embodiment of the invention is illustrated:

Figure 1:
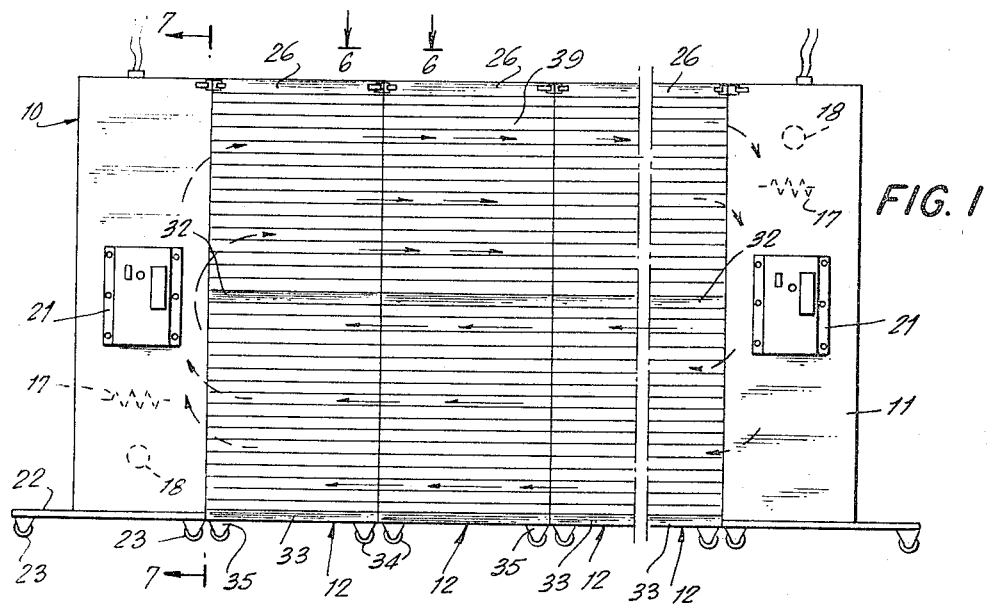
FIGURE 1 is an elevational front view of modular equipment for the controlled dehydration, curing and baking of fresh lettuce and other leaves.
Figure 2:
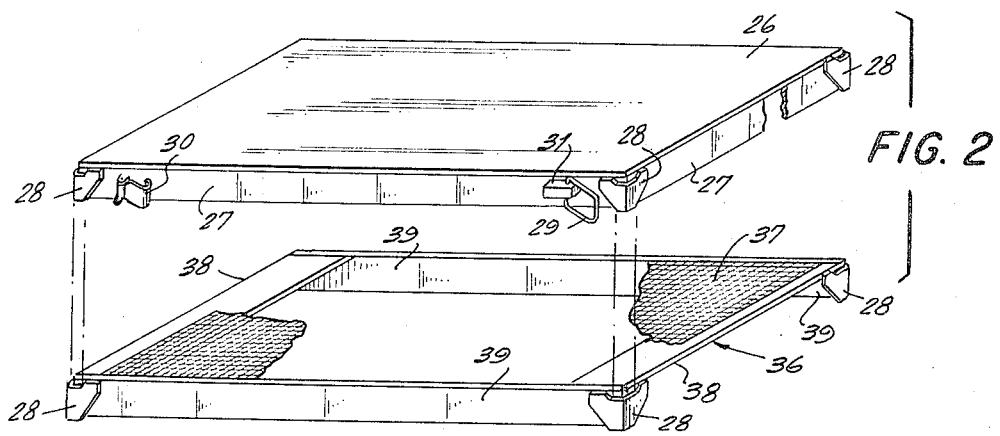
FIGURE 2 illustrates in perspective a top solid tray and and intermediate screen tray of one vertical stack of the equipment of FIGURE 1.
Figure 3:
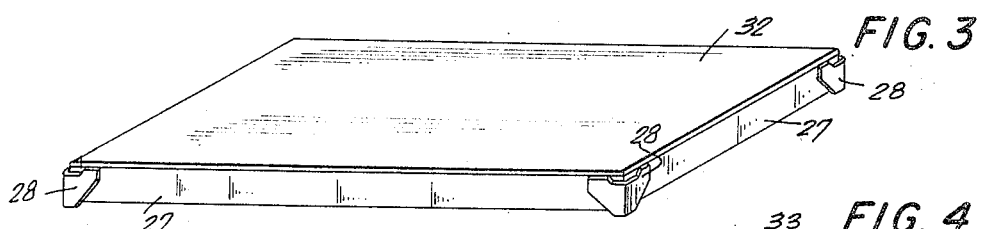
FIGURE 3 is a perspective view of a middle solid tray located approximately midway of the height of one of the stacks of FIGURE 1.
Figure 4:
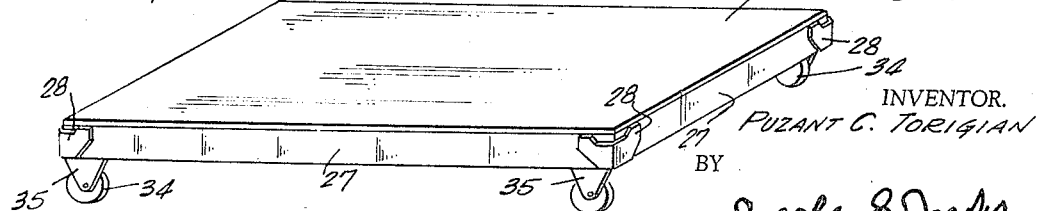
FIGURE 4 is a perspective view of a solid bottom tray of such a stack.

Control equipment in accordance with the present invention comprises two like end units 10 and 11, with a plurality of vertical stacks or trays 12 disposed therebetween, it being noted that only two end units are necessary but that any number of stacks of trays may by employed. Each end unit is identical in construction and comprises a shell 13 which is closed except for that face thereof against which a stack of trays abuts. The shell or housing may be composed of any suitable material such as aluminum or stainless steel or a heat stable synthetic plastic which does not deteriorate or change its dimensions or configuration under the conditions of operation. A screen partition 14 is mounted on the open side of the shell or housing 13 and which is of sufficiently fine mesh to prevent leaves or leaf fragments from being drawn into the interior of the shell or housing. Within the shell or housing are disposed various equipment components necessary to carry out the processing which takes place. One component is a fan 15 driven by an electric motor 16 for causing air flow at the desired velocity and in the predetermined direction and this fan is located above a heater 17 which is of any desired or known type, such as an electric resistance heater, in order to heat the air to the necessary temperature without exceeding a temperature which would destroy the enzymes or the natural leaf structure while at the same time driving out moisture without causing "case hardening," thereby making it possible to reduce the moisture content of the leaves down to a very low value which may, for instance, be of the order of 5%–10% maximum. Since natural leaves vary somewhat in their initial moisture content depending on the time of harvesting or picking, a humidifier 18 is also provided so that whenever necessary or desirable a combination of heating and humidification of air currents can be effected to make sure that the leaves are not dehydrated too rapidly or too completely or under such conditions as would defeat the purposes of the invention. Since fresh leaves ordinarily have a high moisture content both intra-and intercellular, considerable amounts of water vapor of moisture may exist during some stages of operation of the equipment within each of the end units 10 and 11 and in order to prevent excessively high humidity conditions, should such arise, a dehumidifier 19 is disposed above fan 15 and this dehumidifier is essentially a heat exchange unit so constructed that excesss moisture is condensed and the condensed liquid drained off via pipe 20. Thus, it will be seen that a flexible and versatile combination of components is provided which makes it possible to correlate temperature, humidity and air-flow conditions in such a way as to ensure the production of a dehydrated, cured and/or baked leaf suitable for making tobaccoless smokes, although it is to be understood that the use of the equipment is not necessarily limited thereto.

The components within each end unit are suitably mounted in position as shown and are operatively controlled by the switch control box mechanism 21 and the various components are suitably interconnected electrically by appropirate circuitry. Each end unit is also provided with a bottom member 22 having wheels or castors 23 for ready mobility as in assembling and disassembling the equipment or in moving it from one location to another. Each end unit is further provided with a closable opening 24, the area of which can be increased or decreased by means of a slide 25. This forms an air-intake of adjustable area.

Figures 7, 8:
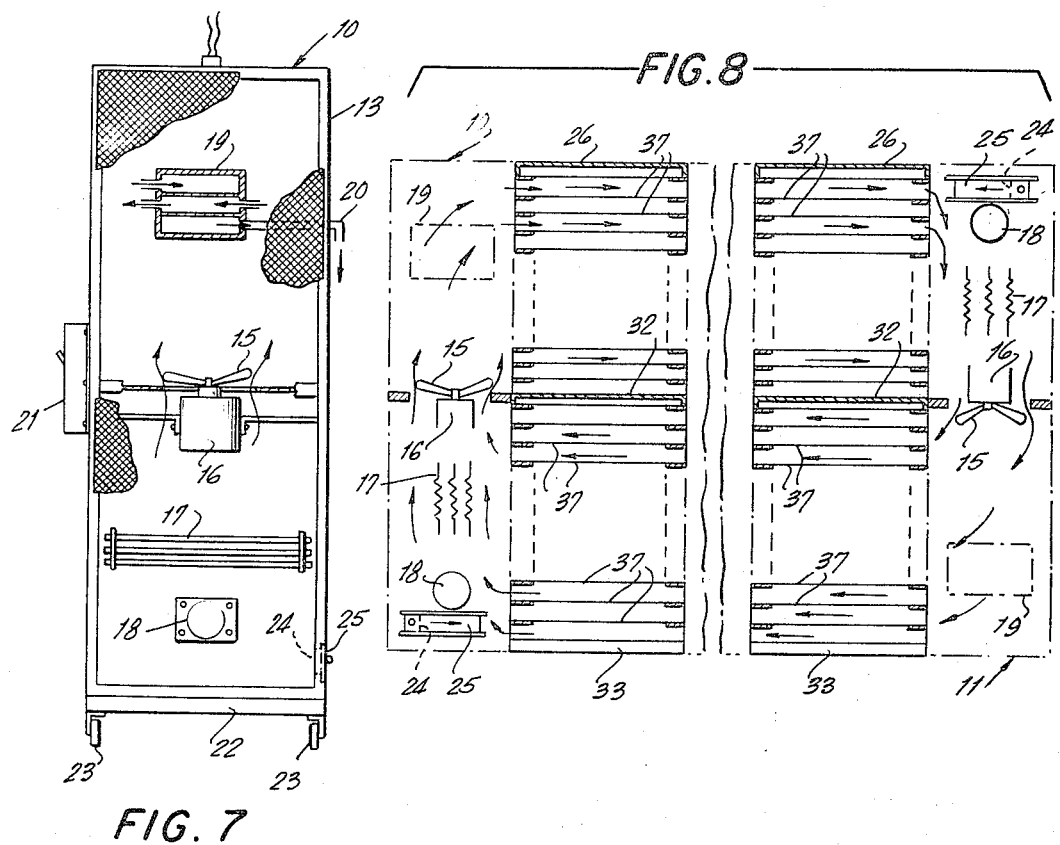
FIGURE 7 is an elevational view of one of the end units of FIGURE 1 looking into the interior thereof and taken along line 7—7 of FIGURE 1.
FIGURE 8 is essentially a diagrammatic view in vertical elevation, partly in section, showing the general assembly and the directions of air flow.

Between end units 10 and 11 a number of vertical stacks of trays are disposed. The height of each stack and the number of stacks may be varied as desired depending upon the particular operation being carried out in the equipment and the length of time to which the leaves or other material is to be exposed for treatment. Each vertical stack of trays has a top tray 26 with a solid and impervious surface. This tray is preferably but not necessarily of rectangular shape and has a depending peripheral flange 27 made up of four parts, the corner junctions of which are secured by a fastening element 28 which may, for example, be spot-welded, brazed or otherwise secured in place. The top tray is also provided on the depending flange at one side and adjacent the opposite ends thereof with a loop 29 and hook 30, respectively, loop 29 being pivotably held in place in a block 31 attached to the flange and hook 30 being pintle-mounted in lugs on the flange. There is also a middle tray 32 which is identical with top tray 26 except that it is not provided with the loop and hook elements. This middle tray 32 acts as a barrier or divider for air flow as will be appreciated from the directional arrows on FIGURES 1 and 8. There is also a bottom tray 33 which is identical with middle tray 32 except that it is provided with wheels or castors 34 mounted in brackets 35. There are a plurality of intermediate trays, the number of which is variable, between top tray 26 and middle tray 32 and between middle tray 32 and bottom tray 33. Each of these intermediate trays, designated by 36, has a mesh screen 37 as its upper surface and this screen is supported at its ends by crosspieces 38 to which the screen is suitably secured. Each intermediate tray further differs from the other trays in that it has depending side flanges 39 but no depending end flanges.

It is to be understood that the leaves or other material to be treated in the equipment are spread out on the screens of the intermediate trays and further that the trays are removable from the assembly, either individually or in stacks both when the leaves or other material are placed on the screens at the beginning of the processing and when the treated or cured leaves or other material are to be removed at the completion of their treatment, or for inspection purposes.

Figure 5:
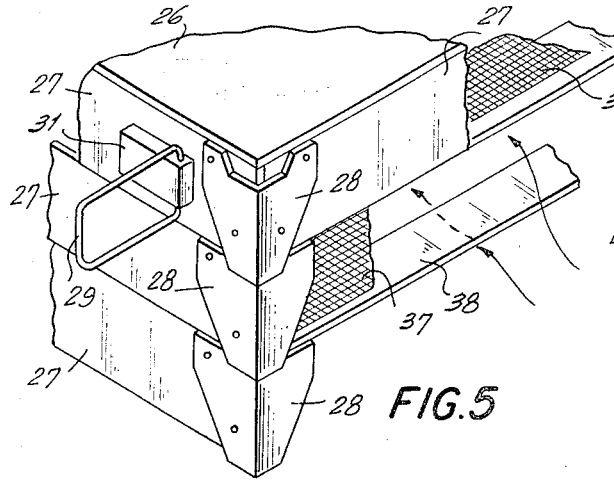
FIGURE 5 is a perspective fragmentary view showing how a plurality of trays are assembled, nested and interlocked.
Figure 6:
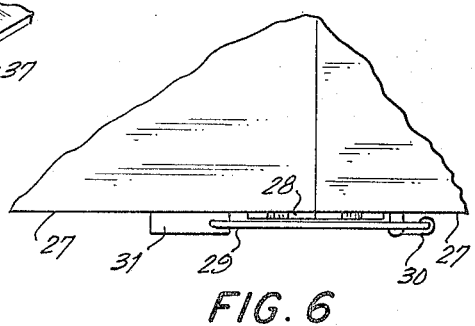
FIGURE 6 is a fragmentary plan view of the locking arrangement taken on line 6—6 of FIGURE 1.

From FIGURES 5 and 6 it will be observed that provision is made for locking either the top or the middle trays in stacked relationship. This is carried out by means of the loops 29 and hooks 30 above referred to and the locking position thereof is shown in FIGURE 6. It is to be understood that the type of locking arrangement is purely illustrative and not limitative since other types of locking arrangements can be equally well used. It has been found however, that the simple type of lock similar to that used on trunks is effective and advantageous. From FIGURE 5 it will further be observed how the trays are stacked and maintained in vertically aligned position. This is carried out by so dimensioning and shaping the corner elements 28 that they interfit or slightly interengage or overlap vertically, thus ensuring the stability of the stack and preventing accidental misalignment, while still enabling the trays to be readily stacked and unstacked.

The equipment of the present invention is thus of a relatively simple inexpensive construction but provides versatility and mobility as well as ready assembly and disassembly. Each end unit and each vertical stack has wheels or castors for easy movement and the provision of the above described components within each end unit makes it possible to carry out a variety of dehydrating, curing and/or baking operations on fresh vegetable leaves or other suitable moisture-containing materials, in order to produce the desired product, which in the specific instance here involved is the conversion of lettuce leaves into a form in which they can be rolled and wrapped and cut into the shape of ordinary cigarettes to provide what is herein termed a tobaccoless smoke, which is free or substantially free from health hazards. It is to be understood also that any suitable flavoring material can be incorporated in the leaves or other material as they are being processed or after the termination of such processing and that the same is true of coloring matter when it is desired that the processed leaves shall have the physical appearance and taste characteristics of cured tobacco. Such flavoring and/or coloring can be readily carried out by introducing the appropriate material through the air intake of the end units or in any other suitable or convenient manner such as via the humidifier.

In processing fresh vegetable leaves such as lettuce leaves or other materials to be dehydrated, cured and/or baked it will be understood that the material to be processed is spread out on the intermediate screen trays and the entire equipment assembled in the condition shown in FIGURE 1. The control boxes on end units are then activated as by moving the switches to the "on" position whereupon air is drawn in through the air intakes and is passed over the humidifying, heating and/or heat exchange components by the air currents created by the fans 15 so that air under desired temperature and humidity conditions follows a closed circuit path as shown by the directional arrows in FIGURES 1 and 8 until the material on the screen trays has acquired the desired characteristics. It will be understood further that the temperature and humidity conditions of the circulating air can be altered as desired and further that the velocity and direction of these air currents can be changed depending upon the specific material on the trays, its initial moisture content and the particular product to be produced. The number of stacks of trays as well as the height of each stack can be varied as desired and instead of having one set of solid middle trays there can be more than one such set where it is desired to make the path of the circulating air longer or more tortuous. In each case however, the stacks of trays must be correlated with the end units so as to form a closed path of travel for the circulating air. It is also possible to vary the structural features of the various units and components without departing from the scope or spirit of the invention and such variations and modifications are to be understood as falling within the appended claims.

What is claimed is:

1. Modular equipment for the treatment of fresh vegetable leaves and other moisture-containing materials which comprises a pair of like end units facing each other and a series of intervening vertical stacks of trays disposed between said end units, each such vertical stack being provided with a solid surface top tray and a solid surface bottom tray and at least one solid surface intermediate tray and said end units containing control components capable of providing humidity and temperature regulated air currents circulating through said trays and end units in a closed path.

2. Modular equipment according to claim 1 in which each end unit is composed of a shell having a screen facing contiguous to the adjacent stack of trays and air intake of variable area disposed near the bottom of one side thereof.

3. Modular equipment according to claim 2 in which each such end unit is provided with a fan for creating air currents and heating and humidifying components over which air from said variable intake passes.

4. In a modular equipment for the processing of fresh vegetables and the like, an end unit comprising a metallic shell having a solid top, bottom and side and back portions and an open front portion, an electrically driven fan mounted intermediate the top and bottom of said unit, a humidifying element mounted adjacent the bottom of said unit, a heating element mounted between said humidifying element and said fan and electrical control means for predeterminedly rendering said fan and said humidifying and heating elements operative and inoperative, said end unit being also provided between said fan and the top of said end unit with heat exchange device to condense excess moisture and to remove the resulting condensate.

5. Modular equipment for the treatment of vegetable leaves and other moisture-containing leaf-like materials which comprises perforate tray means on which said leaves and leaf-like materials are spread for treatment, a plurality of imperforate tray means above and below said perforate tray means, all said tray means being stacked in vertical alignment, end unit means at each end of said stracked tray means to provide an enclosure with a predetermined path for air currents therethrough and control components in said end unit means for passing air currents of required temperature and humidity for desired periods of time through said stacked tray means.

6. Modular equipment according to claim 1 wherein certain of said solid surface trays are provided with releasable fastening means whereby stacks of said trays may be fastened together.

7. Modular equipment according to claim 5 wherein certain of said imperforate tray means are provided with releasable fastening means whereby stacks of said trays may be fastened together for treatment.

References Cited
UNITED STATES PATENTS

| | | | |
|---|---|---|---|
| 125,703 | 4/1872 | Stevens et al. | 34—238 |
| 465,382 | 12/1891 | Marks. | |
| 592,256 | 10/1897 | Ryder | 34—72 X |
| 1,287,145 | 12/1918 | Vernon | 34—238 |
| 1,355,486 | 10/1920 | Longenecker | 34—238 |
| 1,486,515 | 3/1924 | Cuthbertson | 263—49 X |
| 1,587,573 | 6/1926 | Young | 34—238 |
| 2,154,599 | 4/1939 | Beckwith | 34—238 |
| 2,376,641 | 5/1945 | Waterman | 34—50 X |
| 2,380,555 | 7/1945 | Sholar | 34—212 X |
| 3,135,188 | 6/1964 | Hixon et al. | 217—13 X |

FREDERICK L. MATTESON, JR., *Primary Examiner.*

C. R. REMKE, H. B. RAMEY, *Assistant Examiners.*